(12) United States Patent
Liao

(10) Patent No.: US 10,046,486 B2
(45) Date of Patent: Aug. 14, 2018

(54) MOLD THERMAL CONTROLLING DEVICE AND HOT PRESS SYSTEM

(71) Applicant: Hao-Chieh Liao, Taichung (TW)

(72) Inventor: Hao-Chieh Liao, Taichung (TW)

( * ) Notice: Subject to any disclaimer, the term of this patent is extended or adjusted under 35 U.S.C. 154(b) by 366 days.

(21) Appl. No.: 14/977,657

(22) Filed: Dec. 22, 2015

(65) Prior Publication Data

US 2016/0176081 A1    Jun. 23, 2016

(30) Foreign Application Priority Data

Dec. 22, 2014   (CN) .......................... 2014 1 0803057

(51) Int. Cl.
| | |
|---|---|
| *B29C 33/04* | (2006.01) |
| *B29C 43/52* | (2006.01) |
| *B29C 43/36* | (2006.01) |
| *B29C 45/73* | (2006.01) |
| *B29C 33/30* | (2006.01) |
| *B29C 45/26* | (2006.01) |
| *F28D 1/06* | (2006.01) |

(52) U.S. Cl.
CPC .............. *B29C 43/52* (2013.01); *B29C 43/36* (2013.01); *B29C 33/04* (2013.01); *B29C 33/306* (2013.01); *B29C 45/2673* (2013.01); *B29C 45/7312* (2013.01); *F28D 1/06* (2013.01)

(58) Field of Classification Search
CPC ....... B29C 33/04; B29C 33/306; B29C 43/36; B29C 43/52; B29C 45/2673; B29C 45/2675; B29C 45/73; B29C 45/7312
See application file for complete search history.

(56) References Cited

U.S. PATENT DOCUMENTS 3,406,428 A * 10/1968 Brown ................ B29C 33/0022
                                                                     425/351
5,096,404 A    3/1992 Janos et al.
(Continued)

FOREIGN PATENT DOCUMENTS

| CN | 101823311 | 9/2010 |
|---|---|---|
| CN | 203317606 | 12/2013 |

(Continued)

OTHER PUBLICATIONS

"Office Action of Taiwan Counterpart Application", dated Nov. 14, 2016, p. 1-p. 4.

(Continued)

*Primary Examiner* — James P Mackey
(74) *Attorney, Agent, or Firm* — JCIPRNET

(57) ABSTRACT

A mold thermal controlling device including a first trench, a first temperature control layer and at least a temperature control tunnel is provided. The first temperature control layer includes a first temperature control face, and the first temperature control layer forms a first temperature control trench forming at least a part of the inner surface of the first trench. The first temperature control trench is configured to accommodate a mold and touch with the mold through the first temperature control face. The temperature control tunnel is disposed in the first temperature control layer, and the temperature control tunnel is configured to inject a heated fluid or a cold fluid. When the mold is contained in the first temperature control trench, the first temperature control surface is located between the mold and the temperature control tunnel. A hot press system is also provided.

18 Claims, 11 Drawing Sheets

(56) References Cited

U.S. PATENT DOCUMENTS

| | | | | |
|---|---|---|---|---|
| 5,249,947 | A * | 10/1993 | Inaba | B29C 33/72 425/150 |
| 6,116,888 | A * | 9/2000 | Johnston | B29C 33/04 249/102 |
| 7,520,741 | B2 | 4/2009 | Wilson et al. | |
| 8,162,640 | B2 * | 4/2012 | Chen | B29C 33/04 425/174.6 |
| 2010/0040719 | A1 * | 2/2010 | Lin | B29C 33/04 425/144 |
| 2014/0053609 | A1 * | 2/2014 | Bennett | C03B 19/02 65/171 |

FOREIGN PATENT DOCUMENTS

| | | |
|---|---|---|
| CN | 203973846 | 12/2014 |
| CN | 204367385 | 6/2015 |
| DE | 10 2007 054 723 * | 5/2009 |
| JP | H03234508 | 10/1991 |
| JP | H0486237 | 3/1992 |
| JP | H06238728 | 8/1994 |
| KR | 20010079487 | 8/2001 |
| TW | M246151 | 10/2004 |
| TW | I237351 | 8/2005 |
| TW | M322316 | 11/2007 |
| TW | 201008755 | 3/2010 |

OTHER PUBLICATIONS

Wildfires Technology, "Pro/Engineer 3.0 Wildfire Guide: Injection mold design," Tsinghua University Press R, Jan. 2008, pp. 1-5.

"Office Action of China Counterpart Application," dated Aug. 10, 2017, p. 1-p. 12.

\* cited by examiner

MOLD THERMAL CONTROLLING DEVICE AND HOT PRESS SYSTEM

CROSS-REFERENCE TO RELATED APPLICATION

This application claims the priority benefit of Chinese patent application serial no. 201410803057.5, filed on Dec. 22, 2014. The entirety of the above-mentioned patent application is hereby incorporated by reference herein and made a part of the specification.

TECHNICAL FIELD

The disclosure relates to a mold apparatus and more particularly, to a mold thermal controlling device and a hot press system.

BACKGROUND

In the current mold fabrication techniques, the hot pressing techniques are typically applied to the fabrication of shoe soles. After selecting the appropriate mold for the fabrication of a shoe sole, a mixture of foaming agent is added and heated, and the sole is formed after the mold is cooled. Hence, the temperature control of the mold in the hot pressing process is an important controlling factor.

Presently, the heating of a shoe sole mold is via a hot plate, wherein the shoe sole mold is placed on a hot plate with a hot liquid tunneling through and the shoe sole mold is heated via heat conduction. However, relying the conduction method for heat conduction is time consuming. Further, the surface of the mold, used in hot pressing, is closer to the hot plate, and that surface of the mold is heated faster than other areas of the mold, resulting in an overall uneven heating. Furthermore, the heat emitted from the hot plate does not absorbed solely by the neighboring regions of the hot pressed surface. Consequently, power consumption is increased.

The current technology further includes directly incorporating a heating unit in the mold. However, such a mold necessitates a reconnection of the wirings of the hot plate when the mold is being replaced; hence, the mold replacement process becomes more complicated. Further, incorporating a heating unit in the mold increases the fabrication cost and the removable heating pipelines also present safety issues.

SUMMARY

An embodiment of the disclosure introduces a mold thermal controlling device for efficiently heating or cooling a mold.

An embodiment of the disclosure introduces a hot press system, in which the mold can be easily replaced, and an efficient heating or cooling of the mold is provided.

According to an exemplary embodiment of the disclosure, a mold thermal controlling device includes a first trench, a first temperature control layer and at least a temperature control tunnel. The first temperature control layer includes a first temperature control face and the first temperature control layer forms a first temperature control trench forming an inner surface of a part of the first trench. The first temperature control trench is used for accommodating or containing a mold and is in contact with the mold through the first temperature control face. The temperature control tunnel is disposed in the first temperature control layer. A heated fluid or a cold fluid is injected into the temperature control tunnel. When the mold is placed in the first temperature control trench, the first temperature control face is positioned between the mold and the temperature control tunnel.

According to an embodiment of the disclosure, the above mold thermal controlling device further includes a first surface having a first trench, and the opening of the first trench is positioned at the first surface. The cross-sectional area of first trench tapers from the opening of the first trench along the first direction, and the mold is placed in or removed from the first trench along the first direction.

According to an embodiment of the disclosure, a hot press system includes a mold and the above-mentioned mold thermal controlling device. The mold thermal controlling device applies a pressure to the mold along the first direction. The surfaces of the mold that is in contact with the first temperature control layer protrudes and concaves along the first direction, and the cross-section of the opening of the first trench tapers along the first direction. The mold is placed in or removed from the first trench along the first direction.

According to an embodiment of the disclosure, the above mold thermal controlling device further includes at least an interior trench structure formed at an inner surface of the first trench, and when the mold is placed in the first temperature control trench, the interior trench structure and the mold form a gap.

According to an embodiment of the disclosure, when the above mold is placed in the first temperature control trench, at least an interior trench structure communicates to the outside of the mold thermal controlling device.

According to an embodiment of the disclosure, the above mold further includes a tunnel connecting the inner surface of the mold to the exterior surface of the mold that is contacting with the surface of the first temperature control face, and when the mold is placed in the first temperature control trench, the tunnel connects with the interior trench structure that communicates to the outside.

According to an embodiment of the disclosure, the first temperature control face includes a plurality of flat surfaces and two neighboring flat surfaces form the interior trench structure to protect the mold.

According to an embodiment of the disclosure, the interior trench structures communicate with each other.

According to an embodiment of the disclosure, the above first trench further includes a one-way tunnel to connect the inner surface of the first trench to the outside.

According to an embodiment of the disclosure, the above mold thermal controlling device further includes a top base and a bottom base. The bottom base includes a first surface that is formed with a first trench. The top base includes a second surface, a second trench and a second temperature control layer. The second surface of the top base is laminated to the first surface of the bottom base along the first direction. The second trench is formed at the second surface. The second temperature control layer covers the inner surface of the second trench and form a second temperature control trench. At least a temperature control tunnel is disposed in the second temperature control layer. The second temperature control trench is used to accommodate another mold, and the another mold is in contact with a second temperature control face of the second temperature control trench. When the top base and the bottom base are laminated together, the mold and the other mold form a mold spacing, and the first temperature control trench and the second temperature control trench encloses the mold spacing.

According to an embodiment of the disclosure, a part of the temperature control tunnel forms at least a protruding strip on the first temperature control face.

According to an embodiment of the disclosure, the surface of the mold that is in contact with the first temperature control layer has at least a trench, and the trench is used to accommodate the protruding strip.

According to an embodiment of the disclosure, the above temperature control tunnel includes at least an inflow section for the heated fluid or the cold fluid to flow from the first temperature control face to the first temperature control trench.

According to an exemplary embodiment of the disclosure, the above mold further includes an internal tunnel. When the mold is placed in the first temperature control trench, the internal tunnel is connected to the inflow section.

According to an exemplary embodiment of the disclosure, at least a part of the above temperature control tunnel includes a flow channel on the first temperature control face.

According to an exemplary embodiment of the disclosure, the surface of the mold that is in contact with the first temperature control layer includes at least a mold flow channel for injecting the heated fluid or the cold fluid.

According to an exemplary embodiment of the disclosure, the temperature control tunnel includes at least an injection end and at least a discharge end. The injection end and the discharge end pierce through the first temperature control layer for the heated fluid or the cold fluid to inject at the injection end and to discharge at the discharge end.

According to an exemplary embodiment of the disclosure, the inner surface of the first temperature control trench includes a plurality of microstructures.

To recapitulate, the mold thermal controlling device of the embodiments of the disclosure includes the temperature control trench formed with the temperature control layer, wherein the temperature control tunnel can heat or cool the mold being placed in the trench more efficiently. Further, because the hot press system of the embodiments of the disclosure includes the mold thermal controlling device that can efficiently heat or cool the mold, a hot pressing process with a good yield is provided.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1A:
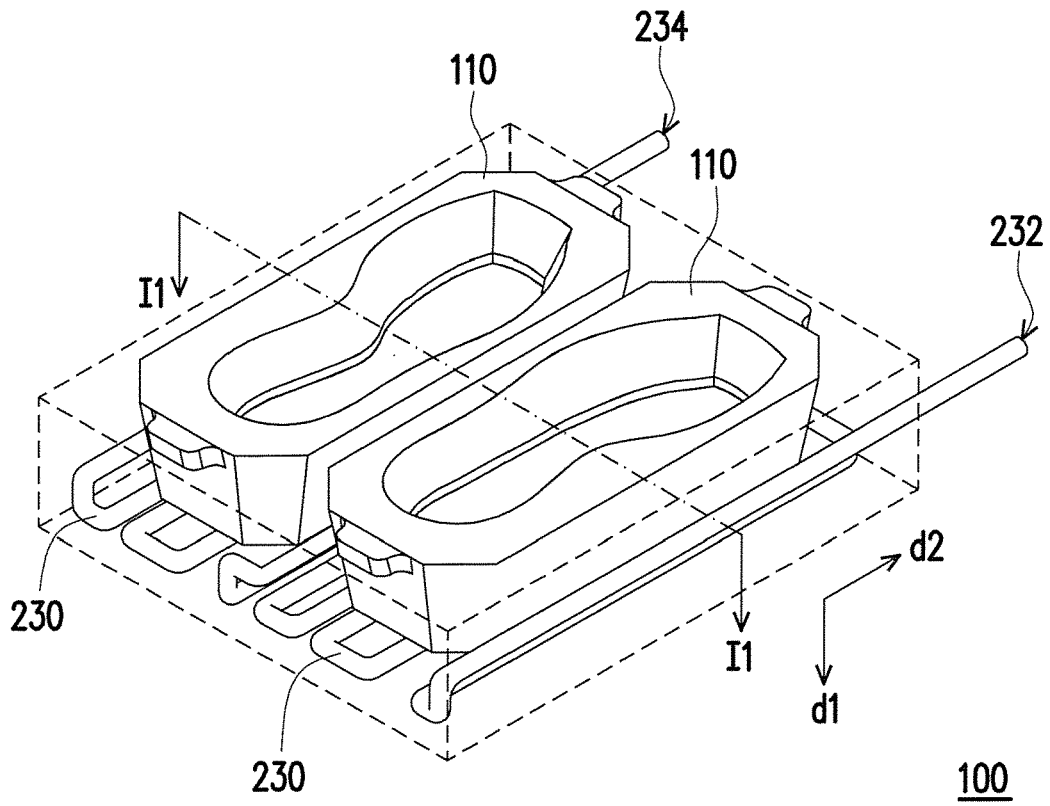
FIG. 1A is a schematic view exemplarily illustrating a mold thermal controlling device and a mold according to a first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1B:
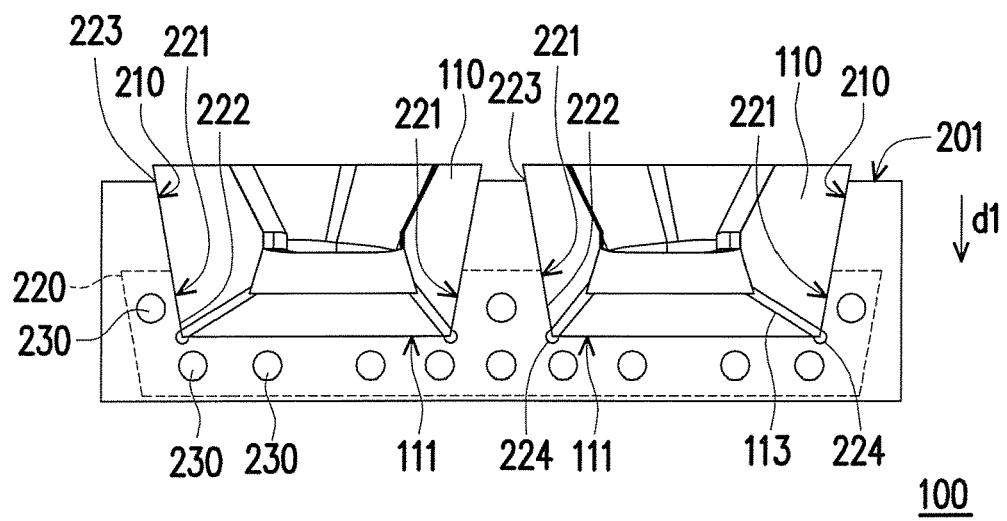
FIG. 1B is a cross-sectional view of FIG. 1 along the cutting line II-II.

FIG. 1A is a schematic view exemplarily illustrating a mold thermal controlling device and a mold according to a first embodiment of the disclosure. FIG. 1B is a cross-sectional view of FIG. 1 along the cutting line II-II. In order to more clearly depict the interior layout of the mold thermal controlling device, a perspective view of some components thereof are illustrated in FIG. 1A; however, it should be understood that the application is not limited thereto. Referring to FIG. 1A and FIG. 1B, in the first embodiment of the disclosure, the mold thermal controlling device 100 includes a first trench 210, a first temperature control layer 220 and at least a temperature control tunnel 230. The first temperature control layer 220 is formed at the inner side of the first trench 210, which means the first temperature control layer 220 forms a first temperature control trench 222 forming at least a part of the inner surface of the first trench 210. A heated fluid or a cold fluid is injected into temperature control tunnel 230. The injected fluid may include a liquid or a gas or other appropriate mixtures, and the application is not limited thereto.

The first temperature control layer 220 includes a first temperature control face 221 that forms the inner surface of the first temperature control trench 222. The first temperature control trench 222 serves to accommodate or contain a mold 110 and contacts with the mold 110 through the first temperature control face 221. When the mold 110 is placed in the first temperature control trench 222, the first temperature control face 221 is positioned between the temperature control tunnel 230 and the mold 110. Alternatively speaking, when the mold 110 is placed in the first temperature control trench 222 and the fluid at a higher temperature is injected into the temperature control tunnel 230, the first temperature control layer 220 is heated via the heated fluid passing through the temperature control tunnel 230. Further, the mold that is being placed in the first temperature control trench 222 is also being heated. Based on the disposition of the first temperature control layer 220 in this embodiment, heat conduction to the mold 110 is more efficient via the first temperature control trench 222. Moreover, since the first temperature control trench 222 can provide a three-dimensional heating space, which renders a more efficient way of heating or cooling a smaller size mold, a desire thermal control effect is thereby achieved.

Further, the above first temperature control layer 220 is mainly disposed at the where the temperature control tunnel 230 is configured, and the first temperature control layer 220 and the first trench 210 are not limited to be formed from the same component. In another embodiment, they may be formed from two different components. It should be understood that the temperature control layer and the trench in other embodiments are not limited by the method of forming the components.

In other embodiments, the mold and the mold thermal controlling device may be integrally formed. In other words, based on the configurations of the first temperature control trench and the temperature control tunnel, efficient heating or cooling can be provided to the inner surface of the shaped first mold.

More specifically, referring to FIG. 1B, in the first embodiment of the disclosure, the mold thermal controlling device 100 includes a first surface 201 and a first trench 210 forming thereon; in other words, the opening 223 of the first trench 210 is formed on the first surface 201. The cross-sectional area of the first trench 210 tapers from the opening 223 along the first direction d1. In other words, in this embodiment, the bottom surfaces of the first trench 210 and the first temperature control trench 222 are smaller than the opening 223. A mold 110 having a corresponding convex surface 111 can be easily placed in or removed from the first temperature control trench 222 along the first direction d1. Accordingly, the mold controlling device 100 of this embodiment not only can provide a better thermal controlling effect, the mold 110 can easily be replaced. The disclosure is not limited thereto. In another embodiment of the disclosure, the interface between the mold and the first temperature control trench are respectively, for example, a cylindrical surface, a prismatic surface or a flat surface.

Still referring to FIGS. 1A and 1B, in the first embodiment of the disclosure, since the temperature control tunnel 230 and the mold 110 are separable, the mold 110 can be directly removed or replaced from the first trench 210. Accordingly, the user can simply use tools or instruments to remove the mold from or to place the mold in the first trench 210. In other embodiments, the mold 110 can also be provided with, for example, a grabbing structure, a hook or a notch disposed on the surface thereof, and an automated mechanical arm or a manually operated tool can be used to directly replace the mold. In other words, the above mold thermal controlling device 100 not only can efficiently enhance the heating or the cooling through the first temperature control layer 220, its applicability to an automated manufacturing process can be expanded.

Referring still to FIG. 1A, the thermal control tunnel 230 further includes an injection end 232 and a discharge end 234. The injection end 232 and the discharge end 234 pierce through the first temperature control layer 220, and the heated or cold liquid is injected through the injection end 232 and is discharged from the discharge end 234. Since, in this embodiment, the replacement of the mold 110 does not require any changes to the temperature control tunnel 230, deterioration of the temperature control tunnel 230 due to frequent changing is reduced, and safety and the replacement efficiency are improved.

The temperature control tunnel 230 of this embodiment includes one injection end 232 and one discharge end 234; however, the disclosure is not limited thereto. In other embodiments, the temperature control tunnel 230 may also include a plurality of injection ends 232 and a plurality of discharge ends 234, depending on the heating demands of the mold 110.

More particularly, the user may select the appropriate mold 110 and the mold structure according the size and the structure of the to-be-manufactured product, and combine with the mold thermal controlling device 100 of the disclosure for the heating effect to perform a hot press treatment. Since the mold can be easily replaced when the above mold thermal controlling device 100 is used, the above mold thermal controlling device 100 can be extensively applied. The mold 110 and mold thermal controlling device 100 may form with materials including, for example, aluminum, copper, iron or steel; however, the disclosure is not limited thereto. In other embodiments, the materials of the mold thermal controlling device 100 may further include metal or non-metal type of thermal conductive materials.

Figure 1C:
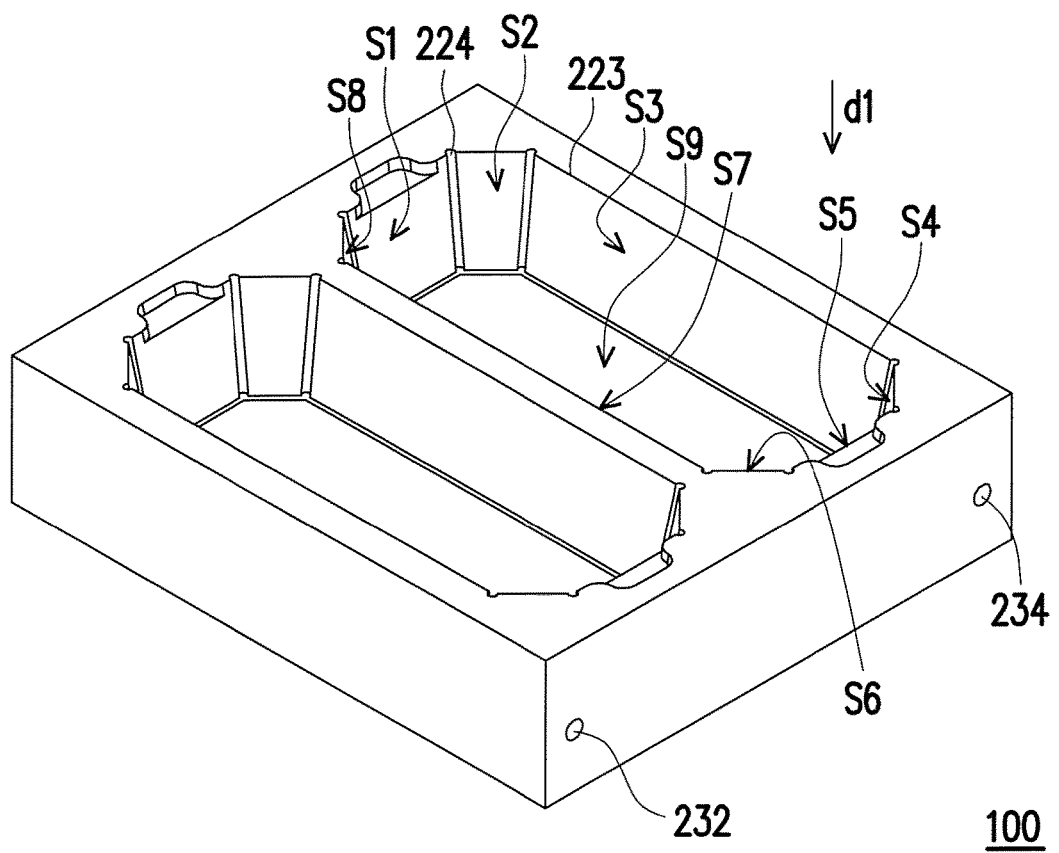
FIG. 1C is a schematic view exemplarily illustrating the mold thermal controlling device according to the first embodiment of the disclosure.

FIG. 1C is a schematic view exemplarily illustrating the mold thermal controlling device according to the first embodiment of the disclosure. Referring to FIGS. 1B and 1C concurrently, the first temperature control face 221 of the above first temperature control trench 222 includes, for example, a plurality of flat surfaces S1-S8 and a bottom surface S9. These flat surfaces S1 to S8 incline along a first direction d1 such that the first temperature control trench 222 is tapered along the first direction d1 from the opening 223 to the bottom surface S9.

In this embodiment, the mold thermal controlling device 100 further includes an interior trench structure 224 formed at the inner surface of the first trench 210. When the mold 110 is placed in the first temperature control trench 222, the interior trench structure 224 and the mold 110 form a gap there-between. More particularly, among these flat surfaces S1 to S8, an interior trench structure 224 is configured between two neighboring flat surfaces (for example, between the flat surface S1 and the flat surface S2). Due to the design of the interior trench structure 224, the edges or corners of the above mold 110 are protected from being bumped or struck and being damaged during the process of being placed in the first temperature control trench 222.

Moreover, when the mold 110 is undergoing the hot pressing process, for example, and a material containing a foaming agent is injected into the mold 110, gas is generated from the foaming agent in the material during the process. Therefore, as shown in FIGS. 1A to 1C, when the mold 110 is placed in the first temperature control trench 222, the interior trench structure 224 communicates to the outside of the mold thermal controlling device, allowing the gas generated during the process to be discharged. More specifically, the interior trench structures 224 in this embodiment are connected with each other to provide an effective gas discharging effect. Further, the tunnel 113 of the mold 110 can be also used in conjunction with the interior trench structure 224 for discharging gas to improve the yield of the hot pressing process.

In the embodiments of the disclosure, it is not limited that the interior trench structures 224 to be connected with each other; in another embodiment, the interior trench structures may include multiple interior trench structures that are connected to the outside but not with each other.

Figure 1D:
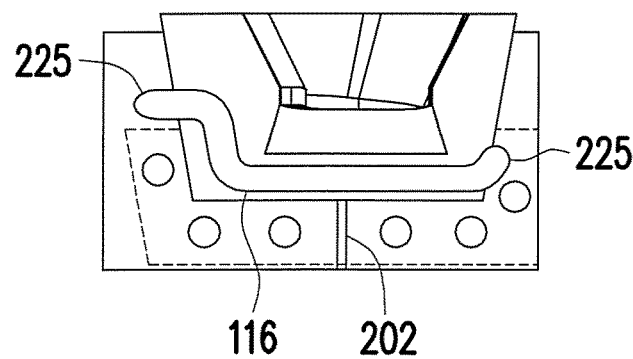
FIG. 1D is a schematic cross-sectional view exemplarily illustrating a mold thermal controlling device and a mold according to another embodiment of the disclosure.

FIG. 1D is a schematic cross-sectional view exemplarily illustrating a mold thermal controlling device and a mold according to another embodiment of the disclosure. In the embodiment of the disclosure as shown in FIG. 1D, the above temperature control tunnel further includes at least an inflow section 225 for the thermal control fluid to flow into the first trench and the first temperature control trench. More specifically, in the embodiment as shown in FIG. 1D, the mold may further include an internal tunnel 116. When the mold is placed in the first temperature control trench, the internal tunnel 116 connects with the inflow section 225 for the thermal control fluid to flow into the mold to provide a direct thermal control to the substances inside the mold. Alternatively speaking, the thermal control tunnel 230 may further rely on the above inflow section 225 for heated or cold fluid to flow to the mold 110. The mold is not limited to be configured with the above internal tunnel 116, trenches or cavities may be further formed to provide the inflow of the heated fluid or cold fluid. The disclosure is not limited thereof.

Still referring to FIG. 1D, in another embodiment of the disclosure, the first trench 210 may further include a one-way tunnel 202, connecting the inner surface of the first trench 210 to the outside of the mold thermal controlling device. When the mold is placed in the first temperature control trench, the mold conceals one end of the one-way tunnel 202. In other words, when the user has to replace the mold during an operation, the mold can be pushed out of the first temperature control trench by injecting a gaseous fluid, for example, to facilitate the replacement of the mold.

Reference will now be made in detail to other embodiments of the disclosure, examples of which are illustrated in the accompanying drawings. Whenever possible, the same reference numbers are used in the drawings and the description to refer to the same or like parts. Similar technical descriptions can be referred to the disclosure of the above embodiments and will not be reiterated hereinafter.

Figure 2A:
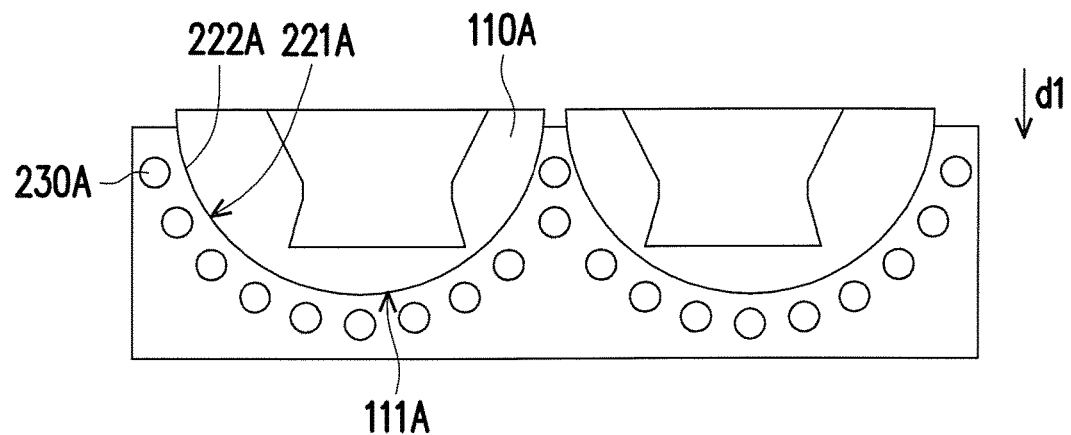
FIG. 2A is a schematic cross-sectional view exemplarily illustrating a mold thermal controlling device and a mold according to a second embodiment of the disclosure.

FIG. 2A is a schematic cross-sectional view exemplarily illustrating a mold thermal controlling device and a mold according to a second embodiment of the disclosure. The shape of the first temperature control trench in the second embodiment is not limited to be the shape of the above first temperature control trench 222. Referring to FIG. 2A, in this embodiment, the first temperature control trench 222A further includes a curve like cross-section. For example, the first temperature control trench 222A has a concave arc-shaped surface 221A concaving in the first direction d1 and the mold has a convex arc-shaped surface 111A. In another example, the first temperature control trench 222A may have a concave cylindrical surface or the like, while the mold 110 has a complementary convex cylindrical surface.

Further, in the second embodiment, the first temperature control trench 222A further includes a plurality of arc-shaped interior trenches (not shown), wherein one end thereof is connected to the outside, and these interior trenches may be used in conjunction with tunnels of the mold 110A for discharging gas to enhance the yield of the hot pressing process. In other words, because these interior trenches and tunnels are not limited by the configuration of the temperature control tunnel, the mold of this embodiment can be integrally formed with the mold thermal controlling device, and the resulting integrated structure has a gas discharging function.

In the second embodiment, the temperature control tunnel 230A is constructed in the form of pipes, wherein a plurality of parallel temperature control tunnels is configured to provide a plurality of inlets and outlets to render an overall uniform temperature change.

Figure 2B:
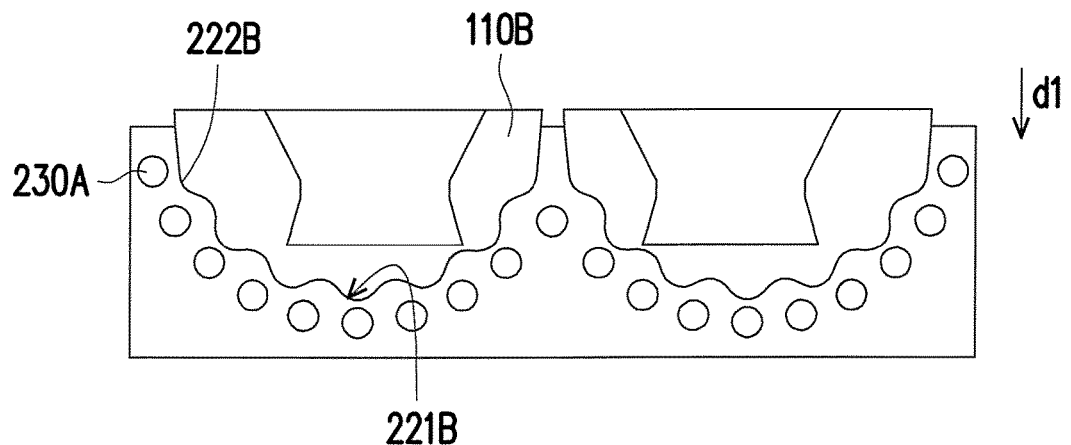
FIG. 2B is a schematic cross-sectional view exemplarily illustrating a mold thermal controlling device and a mold according to another embodiment of the disclosure.

FIG. 2B is a schematic cross-sectional view exemplarily illustrating a mold thermal controlling device and a mold according to another embodiment of the disclosure. In the embodiment as shown in FIG. 2B, the first temperature control face 221B (which is the inner surface of the first trench) of the first temperature control trench 222B and the contact face of the mold 110B may have corresponding microstructures to increase the contact surfaces and to enhance the heating efficiency. Further, the positioning between the mold 110B and the first temperature control face 221B is enhanced to avoid any offset and misalignment. The microstructures in the embodiment as shown in FIG. 2B may be, for example, in a form a plurality of curved surfaces; however, the disclosure is not limited thereto. In other embodiments, the contact surfaces of the first temperature control face and the mold may include step shaped or pyramid shaped microstructures.

Referring again to FIG. 1A and FIG. 1B, the temperature control tunnel 230 in the first embodiment, for example, is configured in a serpentine manner to be distributed throughout the first temperature control layer 220; hence, a good thermal control effect can be provided. Referring to FIG. 1A, the height of the temperature control tunnel 230 may be adjusted as it being curved and turned along the contour of the first temperature control trench 222 in the first direction d1 to provide a uniform thermal control effect. In this embodiment, the temperature control tunnel 230 is disposed at different heights in the first direction d1; however, the disclosure is not limited thereto. Referring to FIG. 2A, the height of the thermal control tunnel 230A changes continuously in the first direction d1 along the arc-shaped surface 221A to provide a uniform and a highly efficient temperature controlling effect.

Figure 3:
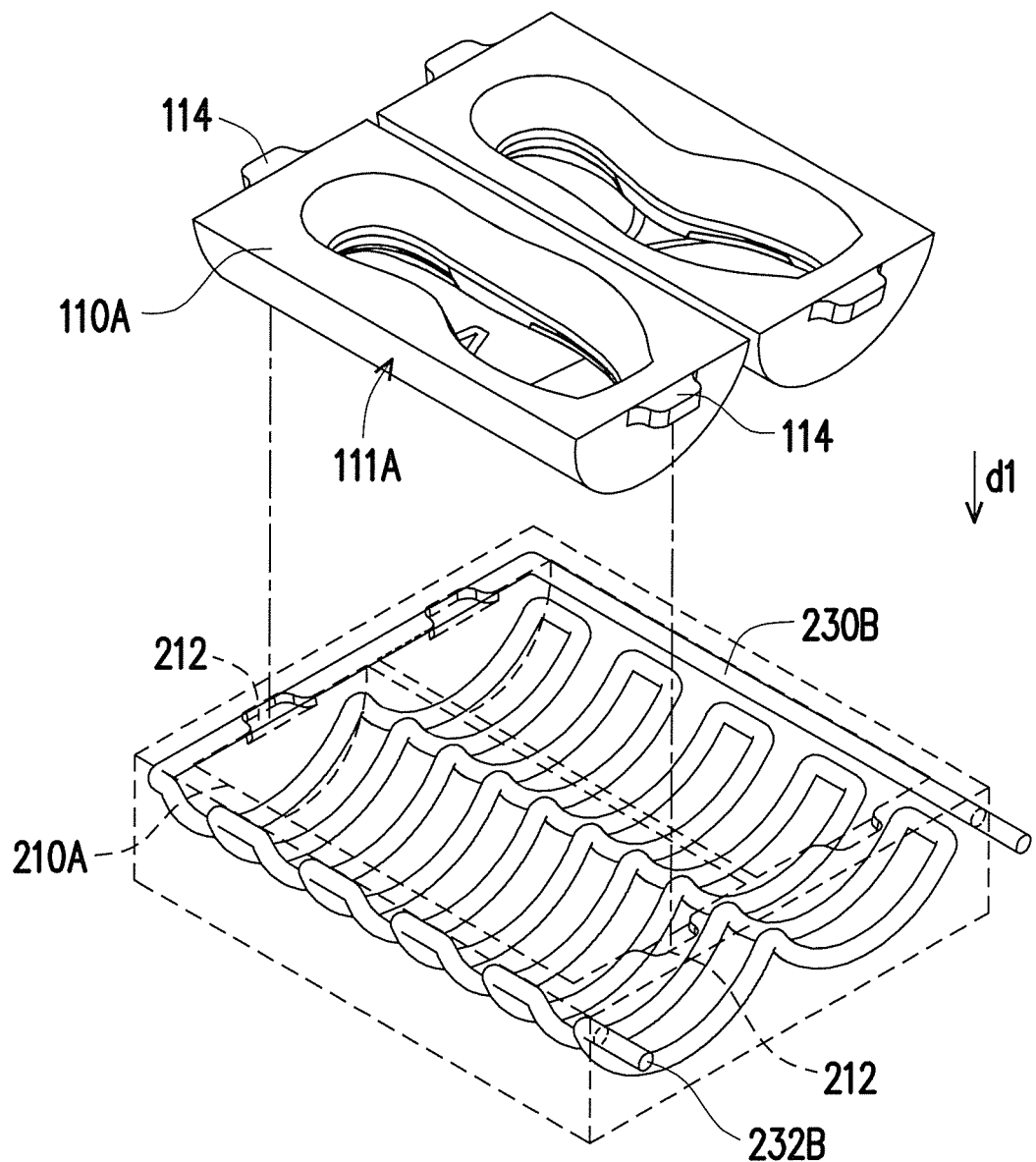
FIG. 3 is a schematic view exemplarily illustrating a mold thermal controlling device and a mold according to a third embodiment of the disclosure.

FIG. 3 is a schematic view exemplarily illustrating a mold thermal controlling device and a mold according to a third embodiment of the disclosure. In the embodiments as shown in FIGS. 1A to 2B, the temperature control tunnels 230, 230A enter the first temperature controlling trench 222, for example like pipes, along the second direction d2, which is parallel to the injection end 232. The temperature control tunnels 230, 230A are bent inside the temperature control trench 222, and most of the temperature control tunnels 230, 230A extend along the second direction d2. However, the disclosure is not limited thereto. According to the embodiment as shown in FIG. 3, the temperature control tunnels 230B are bent inside the first thermal control layer, and most of the temperature control tunnels 230B extend along another direction (in other words, vertical to the injection end 232B). In these embodiments of the disclosure, the temperature control tunnels are appropriately arranged in the directions and routes according to the shape of the first temperature control layer and with a suitable number of the injection ends and the discharge ends. The disclosure is not limited thereto. In other embodiments, the thermal control channels 230, 230A are not limited to be in the form of pipes, a cavity may be configured at the first temperature control layer, for example, forming a interlayer in the first temperature control layer to provide a passageway for the thermal control fluid or forming a temperature control sink on the first temperature control face to control the flow of the thermal control fluid.

Still referring to FIG. 3, the mold 110A in the above embodiments may further include a positioning structure 114, and the first trench 210A may also include positioning notch 212. When the mold 110A is placed in the first trench 210A along the first direction d1, the position structure 114 is positioned in the positioning notch 212, allowing the mold 110A having the convex arc-shaped surface to be disposed at a fixed angle and not to be offset. In other embodiments, the positioning structures 114 may also include, for example, an instrument with a mechanical arm having a structure that can perform the motion of grabbing and lifting. Since the size of the mold 110A is smaller, the mold thermal controlling device improves the heating efficiency and is compatible with automated processes.

Figure 4A:
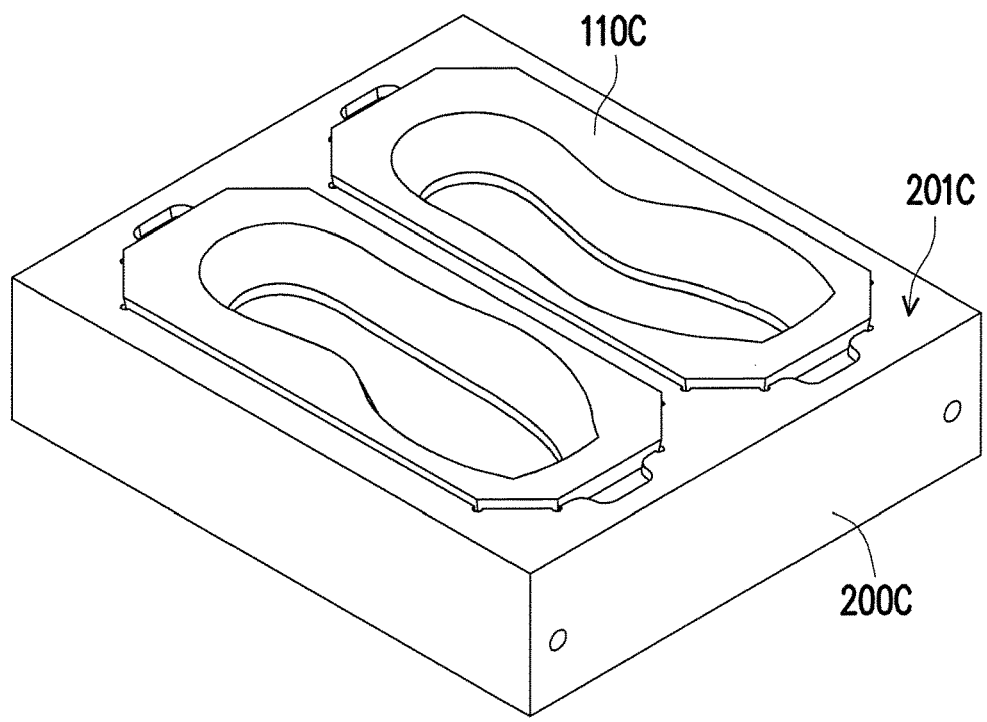
FIG. 4A is a schematic view exemplarily illustrating a bottom base and a mold according to a fourth embodiment of the disclosure.
Figure 4B:
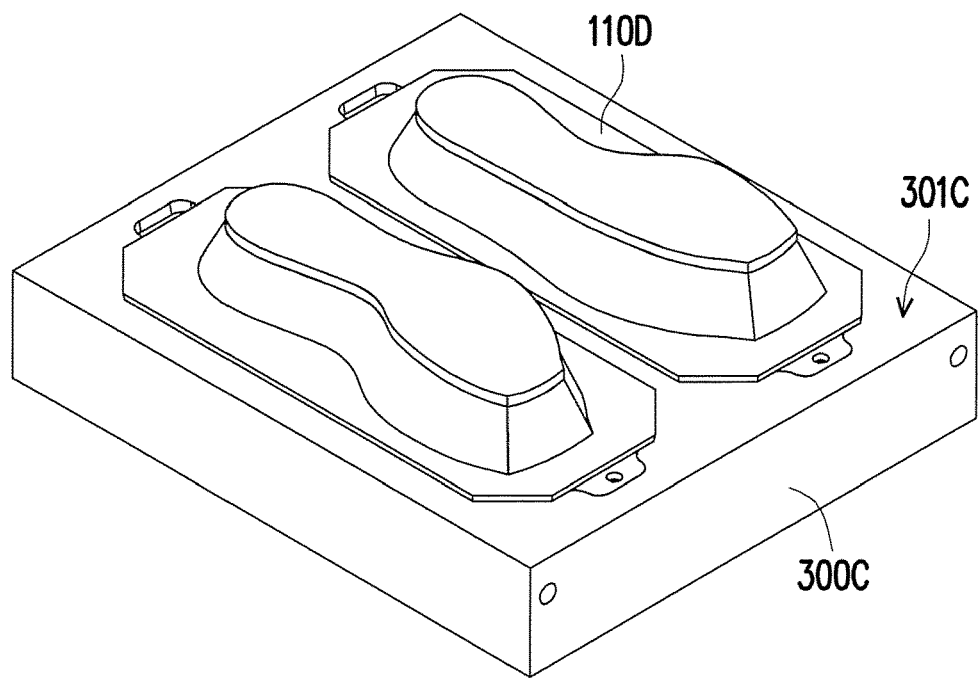
FIG. 4B is a schematic view exemplarily illustrating a top base and a mold according to the fourth embodiment of the disclosure.
Figure 4C:
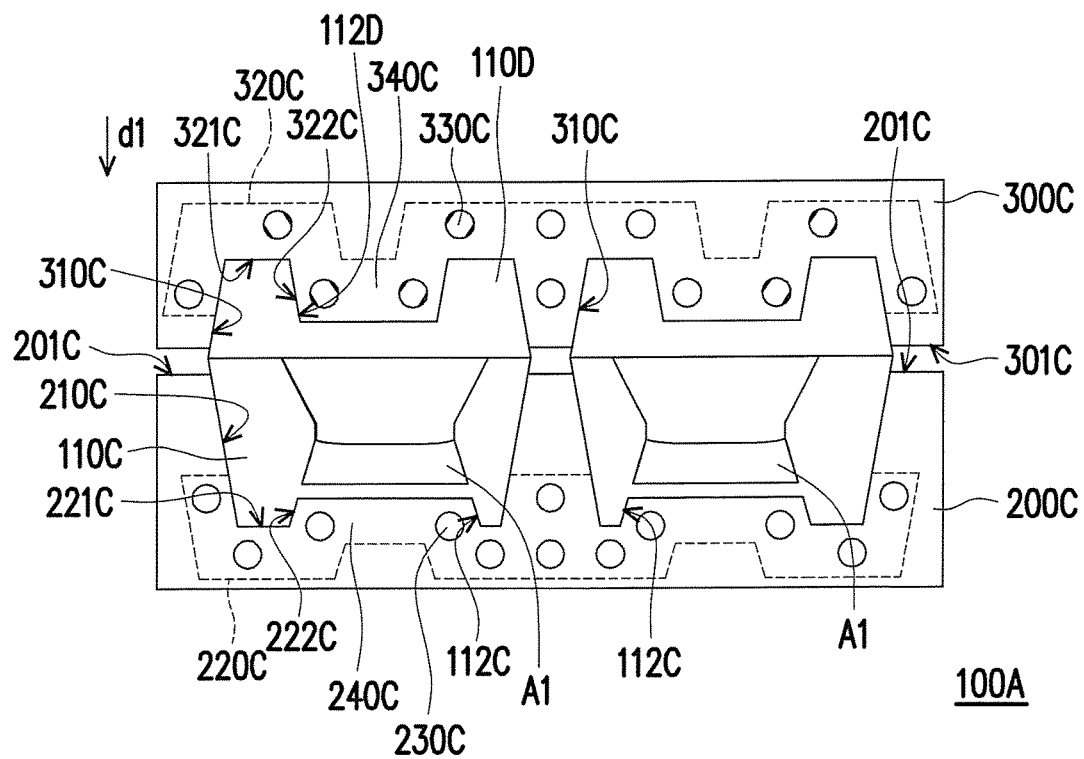
FIG. 4C is a schematic cross-sectional view of a mold thermal controlling device and a mold according to the fourth embodiment of the disclosure.

FIG. 4A is a schematic view exemplarily illustrating a bottom base and a mold according to a fourth embodiment of the disclosure. FIG. 4B is a schematic view exemplarily illustrating a top base and a mold according to the fourth embodiment of the disclosure. FIG. 4C is a schematic cross-sectional view of a mold thermal controlling device and a mold according to the fourth embodiment of the disclosure. Referring to FIG. 4A to 4C, in the fourth embodiment of the disclosure, the mold thermal controlling device 100A further includes a bottom base 200C. The bottom base 200C includes a first surface 201C and a first temperature control layer 220C. A first trench 210C is formed in the bottom base 200C at the first surface 201C. More specifically, the first trench 210C of the bottom base 200C and the first temperature control layer 220C are similar to the above-disclosed first trench 210 and first temperature control layer 220, and the difference lies in that some of the temperature control tunnels 230C form protruding strips 240C at the first temperature control face 221C. In this embodiment, the thermal control protruding strips 240C include, but is not limited to, stepped protrusions, to provide better positioning between the mold 110C and the first trench 210C to thereby enhance the heating efficiency of the mold 110C.

Referring to FIGS. 4B and 4C, the mold thermal controlling device 100A further includes a top base 300C in this embodiment. The top base 300C includes a second surface 301C, a second trench 310C and a second temperature control layer 320C. The second trench 310C is configured at the second surface 301C. The second temperature control layer 320C covers the inner surface of the second trench 310 and also forms a second temperature control trench 322C at the bottom of the second trench 310. Further, a portion of the temperature control tunnels 330C is disposed in the second temperature control layer 320C and forms the thermal control protruding strip 340c at the second temperature control face 321C of the second temperature control trench 322C.

Referring to FIG. 4A to 4C, in this embodiment, the second surface 301C is pressed toward the first surface 201C of the bottom base 200C along the first direction d1. The first temperature control trench 222C is used for accommodating the mold 110C; the second temperature control trench 322C is used for accommodating the mold 110D, and the mold 110D is able to directly contact with the second temperature control face 321C of the second temperature control trench 322C. When the top base 300C and the bottom base 200C are laminated together, a molding space A1 is formed between the mold 110C and the mold 110D. The first temperature control trench 222C and the second temperature control trench 322C form a three-dimensional heating space, and the three-dimensional heating space surrounds the molding space A1. Accordingly, the mold thermal controlling device 100A enhances the thermal control efficiency during the hot pressing process.

Figure 4D:
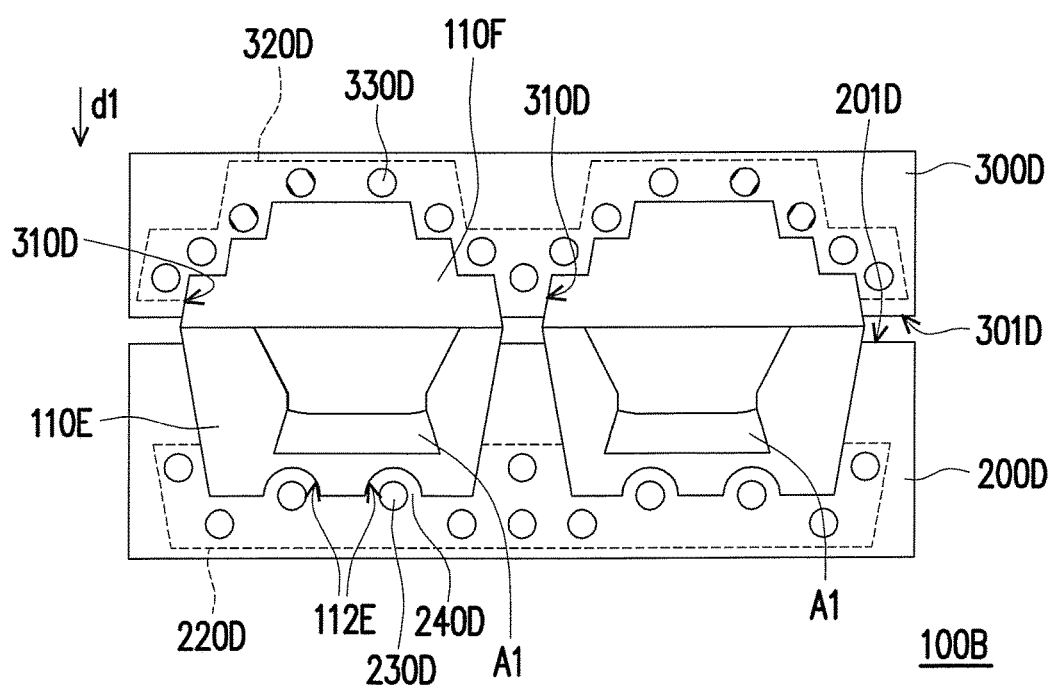
FIG. 4D is a schematic cross-sectional view of a mold thermal controlling device according to another embodiment of the disclosure.

Still referring to FIG. 4A to 4C, in the mold thermal controlling device of the embodiment of the disclosure, the surface of the mold 110D that contacts with the first temperature control trench 222C has a trench 112C, and the trench 112C serves to accommodate the thermal control protruding strip 240C. Further, the surface of the mold 110D that is in contact with the second temperature control trench 322c has a trench 112D, and the trench 112D serves to accommodate the thermal control protruding strip 340C. Accordingly, the heating or cooling efficiency can be further enhanced; however, the disclosure is not limited thereto. FIG. 4D is a schematic cross-sectional view of a mold thermal controlling device according to another embodiment of the disclosure. In the bottom base 200D of the embodiment as shown in FIG. 4D, the surface of the mold 110E that is in contact with the first temperature control layer 220D may has a cylindrical shape trench 112E so as to accommodate the thermal control protruding strip 240D having a corresponding cylindrical shape, and the thermal control protruding strip 240D is formed by a portion of temperature control tunnel 230D. In the top base 300D of the embodiment as shown in FIG. 4D, the surface of the mold 110F that is in contact with the second temperature control layer 320D may further include a multilayer structure to be accommodated in the second trench 310D having a multilayer structure. With the second trench 310D having a multilayer structure, the mold 110F can be easily removed from and placed in the mold thermal controlling device along the first direction d1. Moreover, the mold can be securely positioned in the trench of the mold thermal controlling device. Moreover, the above second trench 310D having a multilayer structure can reduce machining difficulties to improve the manufacturing efficiency. In the embodiment of the disclosure, the structure of the above first trench is not limited to be used in the first trench, the second trench may also have a structure similar to that of the first trench. Conversely, the first trench may also have a structure similar to that of the second trench.

Figure 4E:
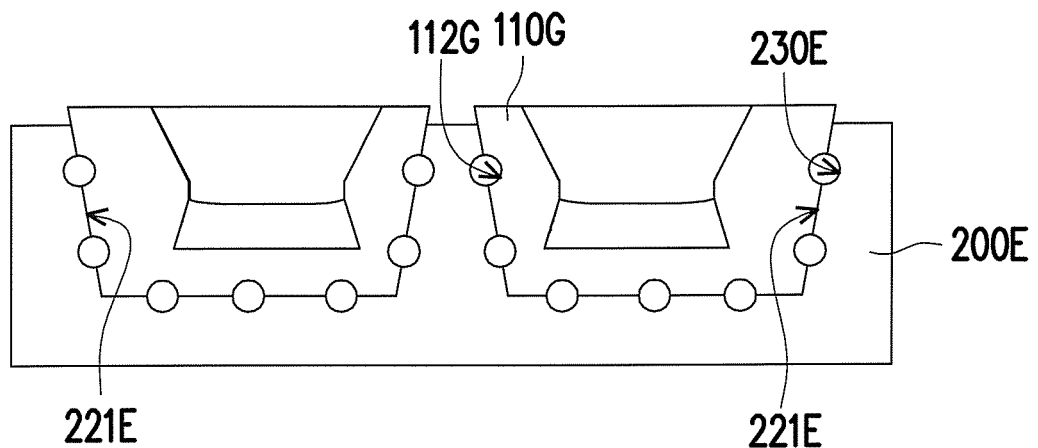
FIG. 4E is a schematic cross-sectional view of a bottom base and the mold according to a fifth embodiment of the disclosure.

FIG. 4E is a schematic cross-sectional view of a bottom base and mold according to a fifth embodiment of the disclosure. Referring to FIG. 4E, in the fifth embodiment, a portion of the temperature control tunnels is a flow channel 230E formed on the surface 221E of the bottom base 200E, and the surface of the mold 110G that is in contact with the surface 221E has the mold flow channel 112G for injecting and discharging the heated or cold fluid. In other words, in this embodiment, the mold 110G and the bottom base 200E together form a space to provide the passage of the heated or cold fluid to mitigate the manufacturing difficulties of the mold 110G and the first temperature control face 221E of the first temperature control layer.

Figure 4F:
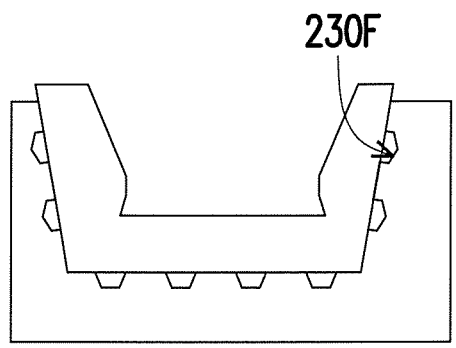
FIG. 4F to 4J are schematic cross-sectional views of the bottom base and the mold according to other embodiments of the disclosure.
Figure 4G:
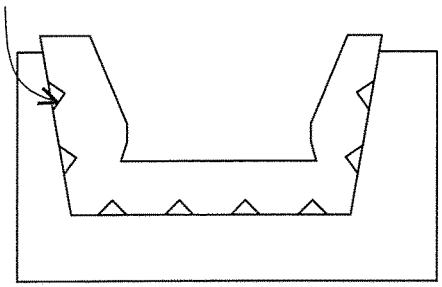
Figure 4H:
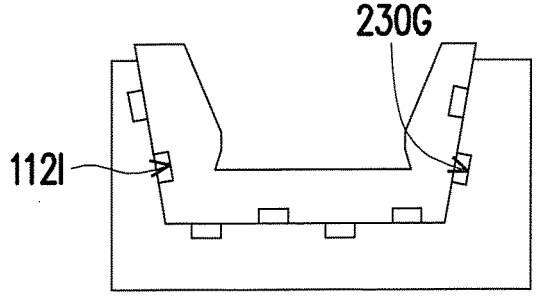

FIG. 4F to 4J are schematic cross-sectional views of the bottom base and the mold according to other embodiments of the disclosure. Referring to FIG. 4F, in this embodiment, the flow tunnel is formed by a flow channel 230F, wherein the flow channel 230F may have a polygonal cross-section; the disclosure is not limited thereto. Referring to FIG. 4G, in this embodiment, the mold flow channel 112H is used to form the flow tunnel. In other words, after the mold is positioned in mold thermal controlling device, the mold flow channel 112H on the mold defines a flow tunnel on the surface of the trench of the mold thermal controlling device for the heated or cold fluid to travel through. Referring to FIG. 4H, in this embodiment, the flow channel 230G and the mold flow channel 112I may be alternately formed between the mold and the first trench as the flow tunnels. In other words, according to the embodiments of the disclosure, the flow tunnels may be formed in the first temperature control layer or between the mold and the first temperature control layer, and the width and the shape of the tunnel may be adjusted according to the design and the processing requirements. The disclosure is not limited thereto.

Figure 4I:
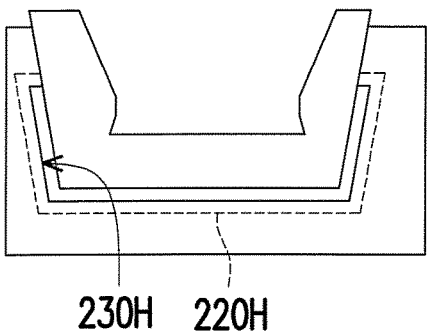
Figure 4J:
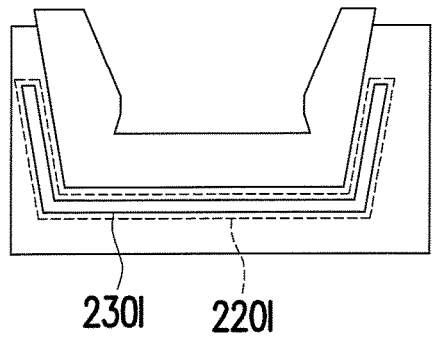

Referring to FIG. 4I, the flow channels is not limited to have the various shapes as described above; in this embodiment and other embodiments, the entire layer of the flow channel 230H is configured in the first temperature control layer 220. In other words, the flow channel in the first temperature control layer 220H is, for example, a thermal control sink, wherein heated fluid or cold fluid can be in contact with the bottom of the mold to achieve the thermal control effect. The disclosure is not limited thereto. Referring to FIG. 4J, in yet another embodiment of the disclosure, the temperature control tunnel 230I in first temperature control layer 200I may be configured in a form of a cavity in the body of the base. Alternatively speaking, an interlayer is formed inside the base to allow the passage of the heated fluid or cold fluid; however, the disclosure is not limited thereto. The user may apply the various designs of the above temperature control tunnel according to the thickness of the mold at the various positions to achieve an overall uniform heating or cooling effect.

Figure 4K:
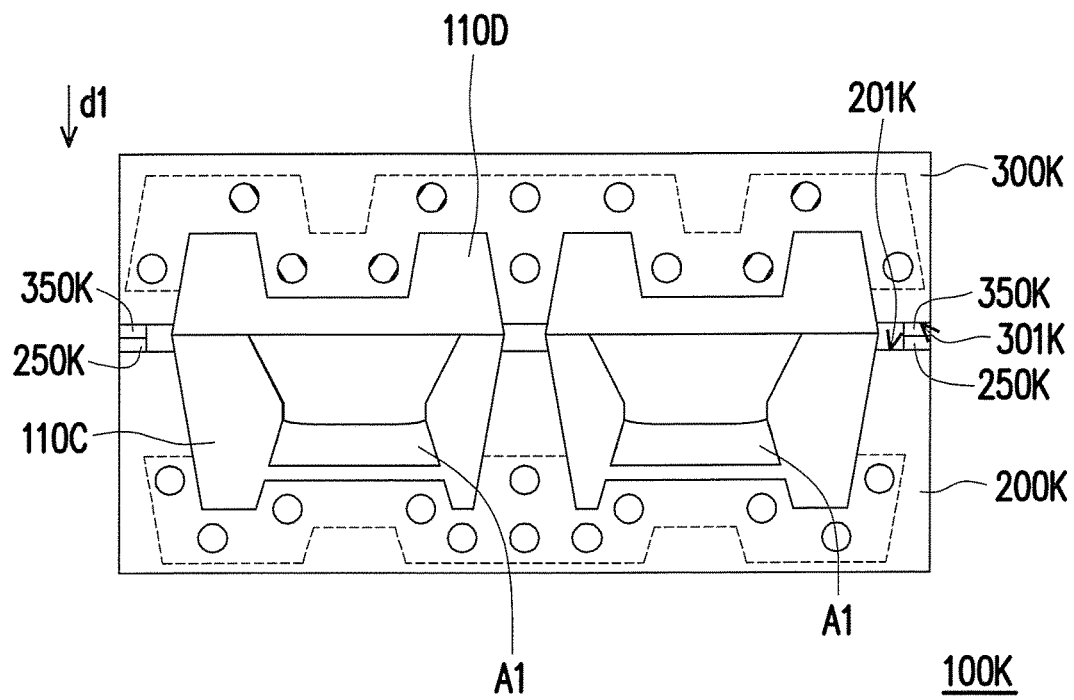
FIG. 4K to 4L are schematic cross-sectional views of a mold thermal controlling device according to other embodiments of the disclosure.
Figure 4L:
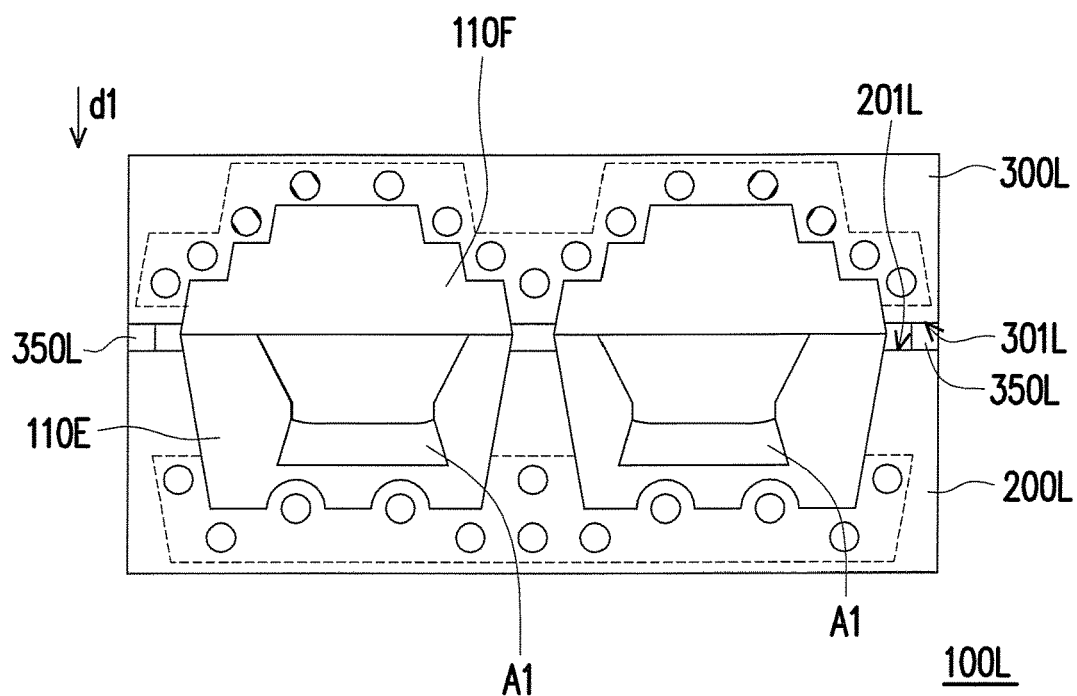

FIG. 4K to 4L are schematic cross-sectional views of a mold thermal controlling device according to other embodiments of the disclosure. In the embodiment as shown in FIG. 4K, similar to the above embodiments (using embodiment as illustrated in FIG. 4C as an example), the bottom base 200K further includes a concealed unit 250K configured on the first surface 201K, and the top base 300K further includes a concealed unit 350K configured on the second surface 301K. When the top base 300K is laminated to the bottom base 200K in the direction d1, a concealed cavity is formed between the two bases and a negative pressure, vacuum or positive pressure treatment can be performed to the molding space A1. Hence, the problem of detachment of the final product and the gas generated in the molding space A1 during the hot pressing process can be precluded. The above negative pressure, vacuum or positive pressure is achieved by configuring a tube at the concealed units, and air is pumped by an air pumping device. A cover may also be used to directly cover any of the above mold thermal control components to form a vacuum in the cover. The disclosure is not limited thereto. The above concealed units 250K, 250L, 350K may form with a material that has a buffering mechanism or a cushioning mechanism, or with other metal or non-metal materials. In some embodiments, the first surface and the second surface may form with a notch having a cushioning pad to accommodate a hard concealed unit. The first surface and the second surface may form with corresponding meshes or teeth structures to form a concealed cavity.

Figure 5A:
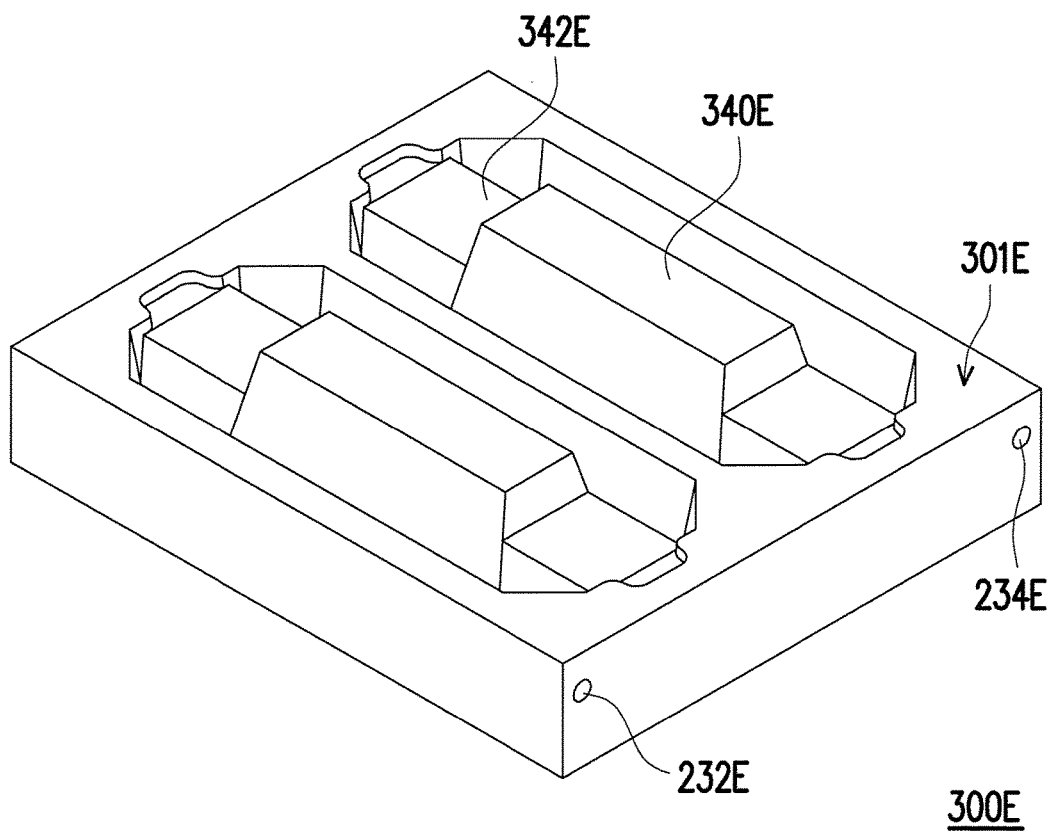
FIG. 5A is a schematic view of a top base according to another embodiment of the disclosure.
Figure 5B:
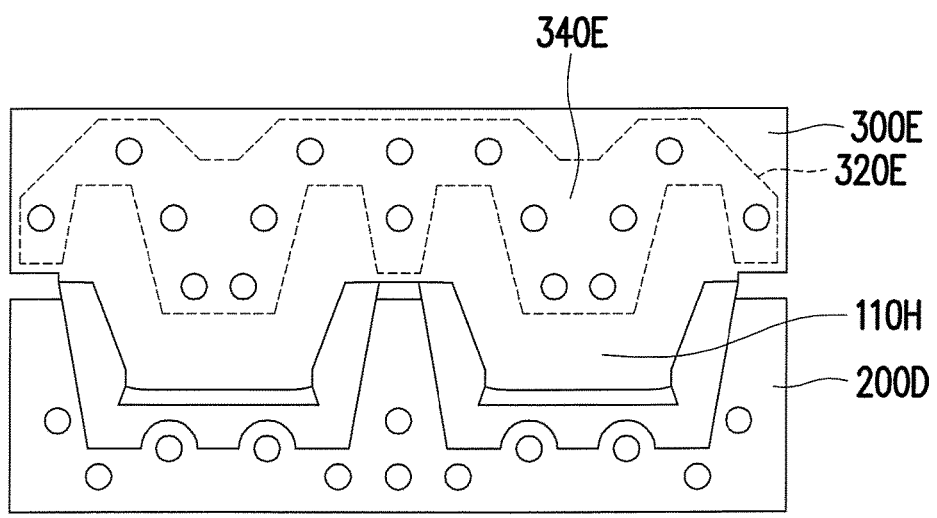
FIG. 5B is a sectional view of a mold thermal controlling device and a mold according to another embodiment of the disclosure.

FIG. 5A is a schematic view of a top base according to another embodiment of the disclosure. FIG. 5B is a sectional view of a mold thermal controlling device and a mold according to another embodiment of the disclosure. Referring to FIG. 5A and FIG. 5B, in this embodiment, the design of the thermal control protruding strip 340 is not limited to those as previously discussed. In this and other embodiments, the bottom base 300E may include the thermal control protruding strips 340E, 342E that are protruded beyond the second surface 301E so that the thermal control of the mold can be more efficiently achieved by the heated fluid or cold fluid at the injection end 232E and the discharge end 234E. The disclosure is not limited thereto and the applicability of the above design may depend on the exterior appearance of the product. Therefore, in other embodiments of the disclosure, the height of the thermal control protruding strip may be increased to reduce the distance between the second temperature control face, for example, and an inner surface of a male mold.

In one embodiment, the top base 300E and the mold 110H are, for example, an integrated component, wherein the temperature control tunnels are directly formed in the component having the mold and using the second temperature control layer 320 for thermal control to achieve a better thermal control efficiency. Alternatively speaking, in the embodiment, depending on the thickness requirement of the upper mold or the male mold, an integrally formed heating mold can improve the thermal control efficiency. In this embodiment, the design of an integrally formed mold and a mold thermal controlling device may depend on whether changing the exterior appearance of the product surface formed by the hot press system is required or not.

Figure 6:
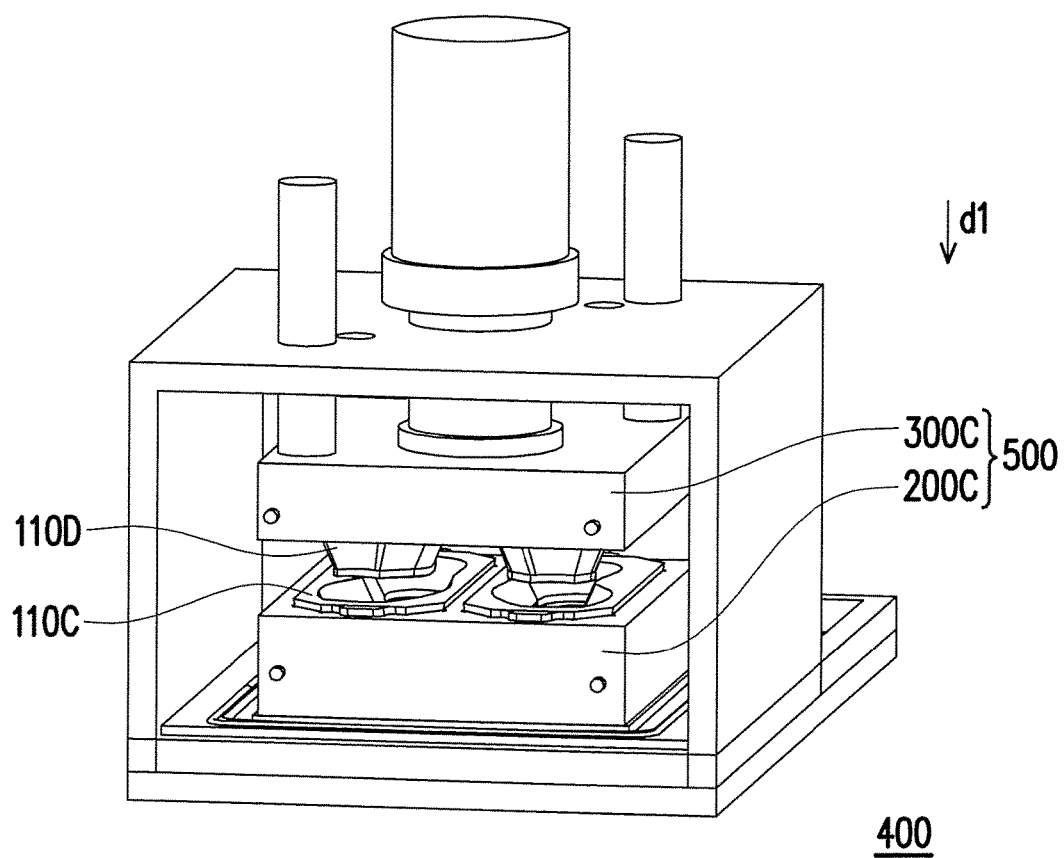
FIG. 6 is a schematic diagram of a hot press system according to the third embodiment of the disclosure.

FIG. 6 is a schematic diagram of a hot press system according to the third embodiment of the disclosure. The hot press system 400 includes the molds 110C, 110D and a mold thermal controlling device 500. The mold thermal controlling device 500 apply pressure to the molds 110C, 110D along the first direction d1. Referring also to FIG. 4C, the surface of the mold 110C, that is used to contact with the first thermal control layer, protrudes and tapers along the first direction D1; the surface of the mold 110D, that is used to contact with the second thermal control layer, protrudes and tapers along the first direction D1. Accordingly, the molds 110C and 110D can be easily placed in the mold thermal controlling device 500 for the hot pressing process, and the molds can be easily replaced as required. The mold thermal controlling device 500 of this embodiment can be any of the mold thermal controlling devices discussed above, and will not be described herein. Moreover, the surfaces of the molds 110C and 110D for contacting the first and second temperature control layers are not limited to be formed with a plurality of inclined surfaces. In other embodiments, the surface of the mold that is in contact with the first temperature control layer may further include the surfaces of the various shapes as illustrated in FIGS. 2A and 2B; the disclosure is not limited thereto. For the hot press system of this embodiment, the molds 110C, 110D can be easily replaced, and are heated or cooled with greater efficiency.

In view of the foregoing embodiments of the disclosure, since the mold thermal controlling device of the embodiments of the disclosure includes a temperature control tunnel that is formed with the temperature control layer, the temperature control tunnel can efficiently heat or cool the mold placed therein. Moreover, the mold used with the mold thermal controlling device can be easily replaced, and there are structures that may be included in or on the mold to assist the positioning of the mold, the gas discharge or to perform a grabbing action. Additionally, the mold thermal controlling device may be applied to an automated fabrication process. Since the hot press system of the disclosure includes the above mold thermal controlling device, which can provide heating or cooling with high efficiency, the hot press system of the disclosure can be broadly applied to various hot pressing processes.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A mold thermal controlling device, comprising:
   a first trench;
   a first temperature control layer comprising a first temperature control face, and the first temperature control layer forming a first temperature control trench forming an inner surface of at least one part of the first trench, and the first temperature control trench is configured to accommodate a mold and contact the mold through the first temperature control face; and
   at least one temperature control tunnel, configured in the first temperature control layer, and a heated fluid or a cold fluid injecting into the at least one temperature control tunnel, wherein when the mold is placed in the first temperature control trench, the first temperature control face is positioned between the mold and the at least one temperature control tunnel,
   at least one interior trench structure formed on the inner surface of the first trench, wherein when the mold is placed in the first temperature control trench, a gap is formed between the at least one interior trench structure and the mold.

2. The mold thermal controlling device according to claim 1, wherein when the mold is placed in the first temperature control trench, the at least one interior trench structure communicates to an outside of the mold thermal controlling device.

3. The mold thermal controlling device according to claim 1, wherein the first temperature control face comprises a plurality of flat surfaces and two neighboring flat surfaces of the plurality of flat surfaces form the at least one interior trench structure for protecting the mold.

4. The mold thermal controlling device according to claim 3, wherein when the at least one interior trench structure is two or more interior trench structures, the two or more interior trench structures communicate with each other.

5. The mold thermal controlling device according to claim 1, wherein the first trench further comprises an one-way tunnel, connecting the inner surface of the first trench to an outside of the mold thermal controlling device.

6. The mold thermal controlling device according to claim 1 further comprising a first surface having the first trench and an opening of the first trench being positioned at the first surface, and a cross-section of the first trench tapering along a first direction, wherein the mold is adapted to place in or remove from the first trench along the first direction.

7. The mold thermal controlling device according to claim 1 further comprising:
   a bottom base comprising a first surface and the first temperature control layer; and
   a top base, comprising:
      a second surface, wherein the second surface of the top base is laminated to the first surface of the bottom base along a first direction;
      a second trench formed at the second surface; and
      a second temperature control layer, covering an inner surface of the second trench to form a second temperature control trench, wherein the at least one temperature control tunnel is configured in the second temperature control layer, and the second temperature control trench is used to accommodate another mold and the second temperature control trench is in contact with the another mold through a second temperature control face, and when the top base is laminated to the bottom base, the mold and the another mold form a molding space there-between, and the first temperature control trench and the second temperature control trench form a three-dimensional heating space, and the three-dimensional heating space encloses the molding space.

8. The mold thermal controlling device according to claim 1, wherein a portion of the at least one temperature control tunnel forms at least one temperature control protruding strip on the first temperature control face.

9. A hot press system comprising:
   a mold; and
   a mold thermal controlling device, applying pressure to the mold along a first direction; the mold thermal controlling device comprising:
      a first trench;
      a first temperature control layer comprising a first temperature control face, and the first temperature control layer forming a first temperature control trench forming an inner surface of at least one part of the first trench, and the first temperature control trench is configured to accommodate the mold and contact the mold through the first temperature control face; and
      at least one temperature control tunnel, configured in the first temperature control layer, and a heated fluid or a cold fluid injecting into the at least one temperature control tunnel, wherein when the mold is placed in the first temperature control trench, the first temperature control face is positioned between the mold and the at least one temperature control tunnel, and a surface of the mold that is in contact with the first temperature control layer protrudes and tapers along the first direction, and a cross-sectional area of the first trench tapers along the first direction, and the mold is adapted to place in or remove from the first trench along the first direction,
      at least one interior trench structure formed on an inner surface of the first trench, and when the mold is placed in the first temperature control trench, a gap is formed between the at least one interior trench structure and the mold.

10. The hot press system according to claim 9, wherein when the mold is placed in the first temperature control trench, the at least one interior trench structure communicates to an outside of the mold thermal controlling device.

11. The hot press system according to claim 10, the mold further comprising at least one tunnel connecting an inner surface of the mold to an exterior surface of the mold for contacting with the first temperature control face, wherein when the mold is placed in the first temperature control trench, the tunnel is connected with the at least one interior trench structure that communicates to the outside.

12. The hot press system according to claim 9, wherein the first temperature control face comprises a plurality of flat surfaces and two neighboring flat surfaces of the plurality of flat surfaces form the at least one interior trench structure for protecting the mold.

13. The hot press system according to claim 12, wherein when the at least one interior trench structure is two or more interior trench structures, the two or more interior trench structures communicate with each other.

14. The hot press system according to claim 9, wherein the first trench further comprises an one-way tunnel, connecting the inner surface of the first trench to an outside of the mold thermal controlling device, and when the mold is placed in the first temperature control trench, the mold conceals one end of the one-way tunnel.

15. The hot press system according to claim 9 further comprising another mold, and the mold thermal controlling device comprising:
  a bottom base comprising a first surface and the first temperature control layer, and the first surface is formed with the first trench; and
  a top base, comprising:
    a second surface, wherein the second surface of the top base is laminated to the first surface of the bottom base along the first direction;
    a second trench formed at the second surface; and
    a second temperature control layer, covering an inner surface of the second trench to form a second temperature control trench, wherein the at least one temperature control tunnel is configured in the second temperature control layer, and the second temperature control trench is used to accommodate the another mold and the second temperature control trench is in contact with the another mold through a second temperature control face, and when the top base and the bottom base are laminated together, the mold and the another mold form a molding space there-between, and the first temperature control trench and the second temperature control trench form a three-dimensional heating space, and the three-dimensional heating space encloses the molding space.

16. The hot press system according to claim 9, wherein a portion of the at least one temperature control tunnel forms at least one temperature control protruding strip on the first temperature control face.

17. The hot press system according claim 9, wherein a portion of the at least one temperature control tunnel is a flow channel on the first temperature control face and a surface of the mold that is in contact with the first temperature control layer comprises at least one mold flow channel for the injection of the heated fluid or cold fluid.

18. The hot press system according to claim 9, wherein the at least one temperature control tunnel comprises at least one inflow section and the mold comprises an internal tunnel, and when the mold is placed in the first temperature control trench, the internal tunnel connects with the at least one inflow section, and the at least one inflow section is used for a temperature control fluid to flow from the first temperature control face into the first temperature control trench.

* * * * *